United States Patent
Naidu et al.

(10) Patent No.: US 7,529,457 B2
(45) Date of Patent: *May 5, 2009

(54) METHODS AND DEVICES FOR TRACING FIBER OPTIC CABLE

(75) Inventors: Shersrin Naidu, Orlando, FL (US); Gene Kaaihue, Orlando, FL (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/123,838

(22) Filed: May 20, 2008

(65) Prior Publication Data

US 2008/0219625 A1 Sep. 11, 2008

Related U.S. Application Data

(63) Continuation of application No. 11/260,590, filed on Oct. 27, 2005, now Pat. No. 7,376,320.

(51) Int. Cl.
*G02B 6/00* (2006.01)

(52) U.S. Cl. ............... 385/134; 385/135; 385/136

(58) Field of Classification Search ............ 385/134, 385/135, 136
See application file for complete search history.

(56) References Cited

U.S. PATENT DOCUMENTS

| 4,872,626 | A | 10/1989 | Lienart |
| 6,396,989 | B1 | 5/2002 | Johnston et al. |
| 6,482,046 | B1 | 11/2002 | Salinas |
| 6,922,473 | B2 | 7/2005 | Turnbull |
| 7,376,320 | B2 * | 5/2008 | Naidu et al. ............ 385/134 |

FOREIGN PATENT DOCUMENTS

| DE | 3226421 | 1/1994 |
| GB | 2354600 | 3/2001 |

* cited by examiner

*Primary Examiner*—Jennifer Doan
(74) *Attorney, Agent, or Firm*—Cantor Colburn LLP

(57) ABSTRACT

Exemplary embodiments include a tracing clip for a fiber optic cable including: a clip body including an inner and an outer surface; a metal clip disposed on the outer surface; a metal tooth disposed on the inner surface, wherein the metal clip tooth connects to a metal element extending substantially axially along the entire length of fiber optic cable and to the metal clip.

11 Claims, 2 Drawing Sheets

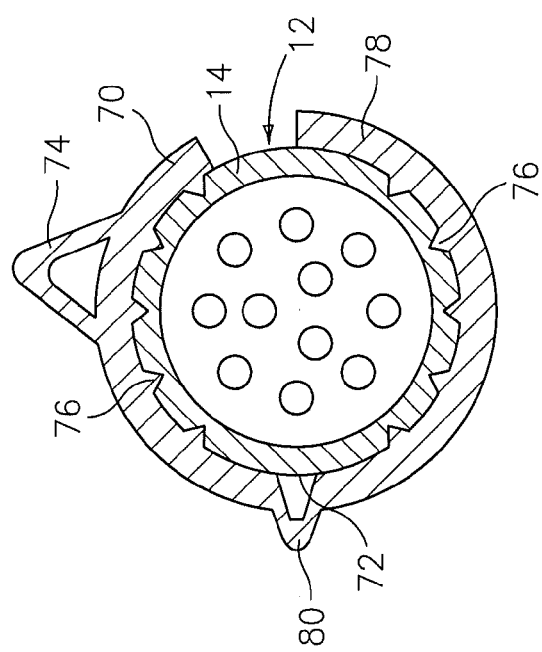
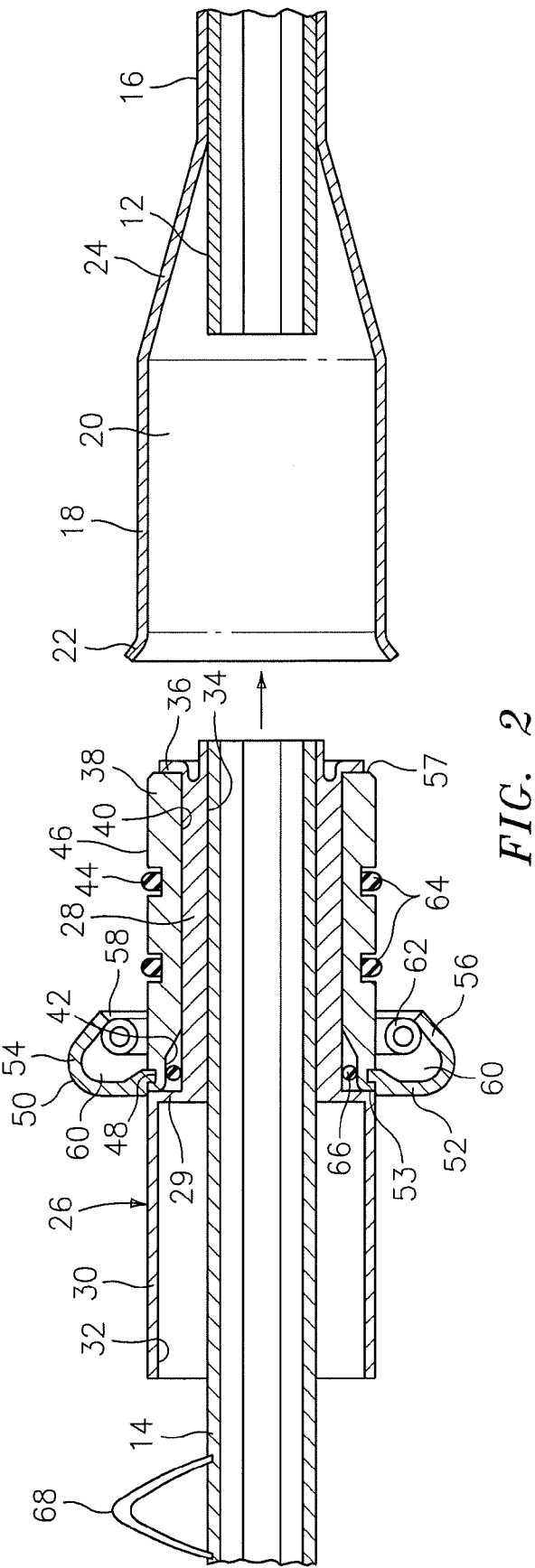
FIG. 3
FIG. 2

METHODS AND DEVICES FOR TRACING FIBER OPTIC CABLE

CROSS-REFERENCE TO RELATED APPLICATIONS

This application is a continuation of U.S. patent application Ser. No. 11/260,590 filed Oct. 27, 2005, now U.S. Pat. No. 7,376,320, the contents of which are incorporated herein by reference in their entirety.

BACKGROUND

It is known that fiber optic cables are used for high-speed communication and data transmission and "piping" or carrying light from a light source. It is also known that these fiber optic cables are typically connected with fiber optic connectors, which may be easily coupled and uncoupled. As used herein, the term "connector" means an article that allows connection, disconnection and reconnection of a fiber optic cable to a light source, as opposed to a permanent connection between the cable and light source. As used herein, the term "light source" may be another fiber optic cable or a light source such as an arc discharge lamp, laser, light emitting diode (LED), filament bulb, etc.

Fiber optic cables are commonly used for the transfer of data within large buildings and between adjacent buildings. In a building complex having extensive telecommunications and data transfer requirements many fiber optic cables will be laid. Initially, the cables are laid in cable ducts, in roof voids, below suspended floors, etc. by a cabling contractor. That same contractor, or another contractor will subsequently terminate the cables to provide the necessary input and output connections.

Many of the fiber optic cables used are wholly non-metallic and typically comprise a glass fiber core surrounded by a plastic sheath. With such cables, unless care is taken in marking the cables at the time of installation it can be difficult for the contractor effecting termination of the cables to identify which of a bundle of cables at one location corresponds to a particular cable at another location, for example in a different building or several floors removed in the same building. Conventional techniques for tracing metal cables cannot be used with fiber optic cables because they do not include any metal member to which a tracing signal can be applied.

SUMMARY

Exemplary embodiments include a tracing clip for a fiber optic cable to a light source including: a clip body including an inner and an outer surface; a metal clip disposed on the outer surface; a metal tooth disposed on the inner surface, wherein the metal clip tooth connects to a metal element extending substantially axially along the entire length of fiber optic cable and to the metal clip.

Exemplary embodiments also include a fiber optic connector for connecting a fiber optic cable to a light source including: a light source housing for connection to a light source; a coupling for connection to a fiber optic cable, wherein the fiber optic cable includes a metal element and the coupling includes a cage for locking the light source housing to the coupling to connect the fiber optic cable to the light source housing; and a metal clip for connecting a tone generator, wherein the metal clip is connected to the metal element.

Further exemplary embodiments include a method of tracing a fiber optic cable including attaching a first tracing clip to a fiber optic cable that includes a metal element axially disposed along substantially the entire length of the cable, said first tracing clip including a metal clip and a metal tooth which form an electrical connection to said metal element and applying a tracing signal to the first tracing clip.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several Figures:

FIG. 2 is an exploded fragmentary view of the fiber optic cable and connector of FIG. 1 according to an exemplary embodiment; and FIG. 3 is a cross sectional view of a fiber optic cable and a tracing clip according to an exemplary embodiment.

DETAILED DESCRIPTION

Figure 1:
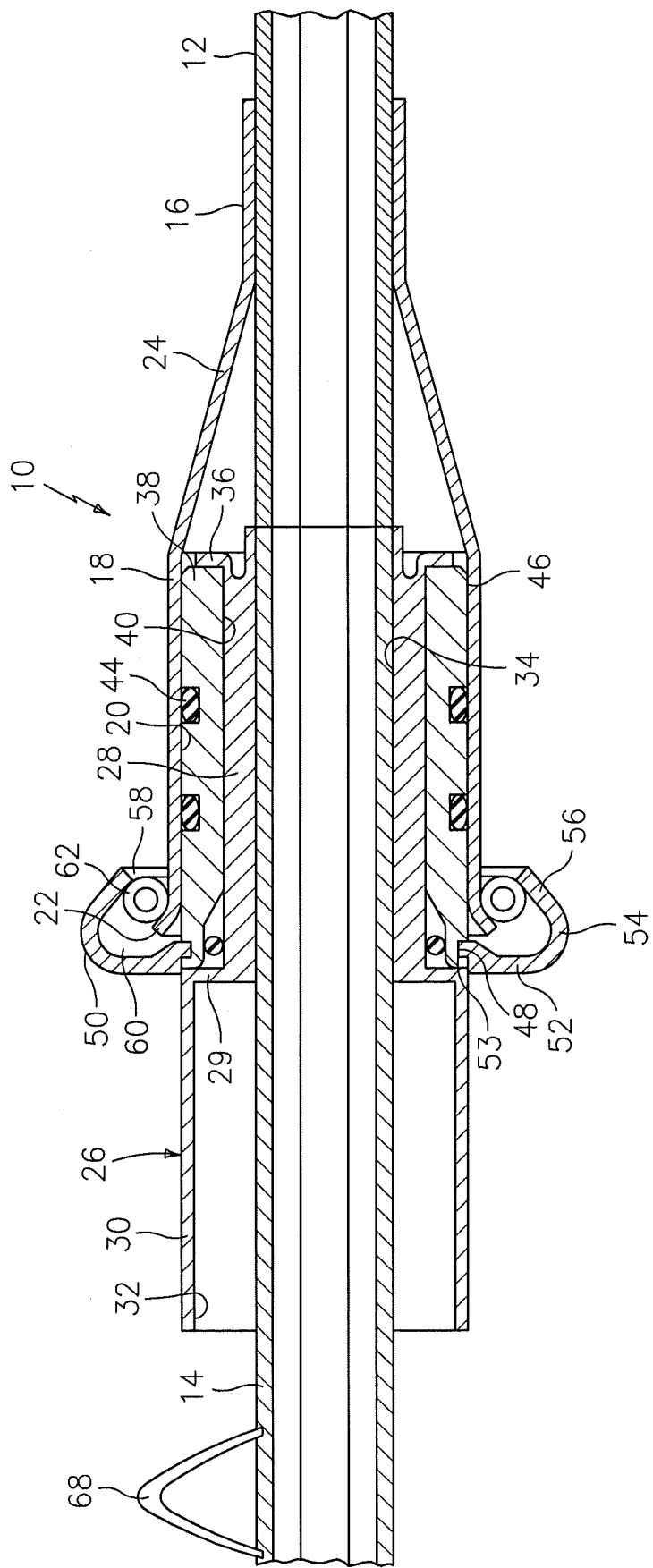
FIG. 1 is a fragmentary view of a fiber optic cable and connector, illustrated in operational relationship with fiber optic cables in an exemplary embodiment.

Referring to FIG. 1, a fiber optic connector 10 is illustrated in operational relationship with a light source such as a first fiber optic cable 12. The fiber optic cables 12 may be a single cable or a plurality of cables bundled together to form a single cable. The fiber optic cables 12 may be made of glass fibers and may split into branches after leaving a fiber optic connector 10. The fiber optic cable 12 includes a metal element 14. The metal element 14 may be in the form of a fine wire, a foil strip, or a metallic layer and extends axially along the entire length of the fiber optic cable. The metal element 14 will be located beneath the outermost covering layer of the fiber optic cable 12 so as to avoid short-circuiting between adjacent fiber optic cables. In exemplary embodiments, the metal element 14 is in the form of a foil ribbon, which is incorporated within the sheath of the fiber optic cable 12.

Referring now to FIGS. 1 and 2, the fiber optic connector 10 includes a female fitting or light source housing 16 connected to one end of the fiber optic cable 12. The light source housing 16 includes an end portion 18 that is generally cylindrical and slightly enlarged from a diameter of the light source housing 16 to form a cavity 20. The light source housing 16 also includes a circumferential flange 22 at a terminal end of the end portion 18. The light source housing 16 includes a transition portion 24 extending between the end portion 18 and a remainder of the light source housing 16. The light source housing 16 is made of a rigid material such as metal. The light source housing 16 is secured to the fiber optic cable 12 by suitable means such as a press-fit.

The fiber optic connector 10 also includes a male fitting or coupling, generally indicated at 26, connected to one end of the fiber optic cable 12 and cooperating with the light source housing 16. The coupling 26 includes a ferrule 28 extending axially to a shoulder 29 extending radially. The ferrule 28 has an end portion 30 generally cylindrical and slightly enlarged from a diameter of the ferrule 28 and extending axially from the shoulder 29 to form a cavity 32. The ferrule 28 also has a passageway 34 extending axially therethrough and communicating with the cavity 32. The fiber optic cable 12 extends through the cavity 32 and passageway 34 and preferably terminates at the end of the passageway 34. The ferrule 28 also has a flange 36 extending radially outwardly near one end thereof. The ferrule 28 is made of a rigid material such as metal. The ferrule 28 is secured to the fiber optic cable 12 by suitable means such as a press-fit. It should be appreciated that the ferrule 28 is a monolithic structure being integral, unitary and formed as one-piece.

The coupling 26 also includes a spud 38 disposed about a portion of the ferrule 28. The spud 38 extends axially and is generally cylindrical in shape. The spud 38 has a passageway 40 extending axially therethrough and the passageway 40 has an enlarged opening 42 at one end thereof. The spud 38 also includes at least one first grooves 44 in an outer surface 46 thereof. The first grooves 44 may be annular and have a generally rectangular cross-sectional shape. The spud 38 also includes a second groove 48 in the outer surface 46 at the end with the enlarged opening 42. The second groove 48 may be annular and generally rectangular in cross-sectional shape. The spud 38 may be made of a rigid material such as metal. The spud 38 is disposed about the ferrule 28 and mechanically locked or secured in place to the ferrule 28 between the shoulder 29 and flange 36 of the ferrule 28, providing a metal-to-metal environmental seal.

The coupling 26 includes a cage 50 connected to one end of the spud 38. The cage 50 has a base portion 52 extending radially and disposed in the second groove 48. The cage 50 is attached at the base portion 52 to the spud 38 by a crimped flange 53 on the spud 38 forming a portion of the second groove 48 to mechanically lock the cage 50 to the spud 38. It should be appreciated that other types of connection are also possible, such as welding, soldering, etc.

The cage 50 also has a curved wall portion 54 and a circular flange portion 56. The curved wall portion 54 is connected to the base portion 52. The circular flange portion 56 is connected to the curved wall portion 54 and is angularly inclined toward a terminal end 57 of the spud 38. The circular flange portion 56 ends at such a point that there is an access opening 58, which allows a portion of the light source housing 16 to be extended therein. The cage 50 defines an annular space 60 around the end of the spud 38. The curved wall portion 54 defines the largest diameter location of the annular space 60. The cage 50 also includes a spring 62 located inside the annular space 60 and normally disposed on the outer surface 46 of the spud 38, which is capable of holding the light source housing 16 to the coupling 26.

The coupling 26 includes at least one first seal 64 disposed in the first grooves 44. The first seal 64 may be an O-ring made of an elastomeric material. The first seal 64 is disposed in one first groove 44 for a function to be described. The coupling 26 may also include a second seal 66 disposed between the spud 38 and ferrule 28. The second seal 66 may be an O-ring made of an elastomeric material. The second seal 66 is disposed about the ferrule 28 in the enlarged opening 42 of the passageway 40 between the ferrule 28 and spud 38 to act as an o-ring seal for enhanced environmental sealing.

In operation of the fiber optic connector 10, the light source housing 16 is connected to the first fiber optic cable 12. The coupling 26 is connected to the fiber optic cable 12 as illustrated in FIG. 2. The end portion 18 of the light source housing 16 is moved axially toward the spud 38 such that the spud 38 and ferrule 28 are disposed in the cavity 20. The end portion 18 is moved over the spud 38 to compress the first seals 64 and the flange 22 enters the access opening 58 in the cage 50. The flange 22 deflects the spring 62 radially and moves axially past the spring 62. The spring 62 returns radially and is disposed between the flange 22 and flange portion 56 to secure the end portion 18 in place on the spud 38 as illustrated in FIG. 1. The fiber optic connector 10 retains the fiber optic cable 12 from moving axially to ensure light transmission efficiency. The fiber optic connector 10 also seals a joint between the coupling 26 and light source housing 16 with the first seals 64 to keep environmental contaminants out of the light source housing 16. The first seals 64 are used to minimize the lateral movement as well as providing a seal. A service tool (not shown) is used to disconnect the coupling 26 and light source housing 16. It should be appreciated that the service tool is conventional and known in the art. It should be appreciated that the fiber optic connector 10 serves as an attachment for connecting two fiber optic cables 12 together.

In exemplary embodiments, the fiber optic cable 12 also includes a metal clip 68 disposed near the fiber optic connector 10. The metal clip 68 is connected to the metal element 14 and may be used for connecting a tone generator (not shown) to the fiber optic cable 12. The tone generator may be used to trace the fiber optic cable 12 by applying a tracing signal to the metal element 14 disposed on one end of the fiber optic cable 12, and detecting the tracing signal at the other end of fiber optic cable 12.

Referring now to FIG. 3, a tracing clip 70 may be used to trace the fiber optic cable 12. The tracing clip 70 includes a metal clip 74, a clip body 78 and one or more metal teeth 76. The metal teeth 76 are electrically connected to the metal clip 74. The metal teeth 76 are disposed on an inner surface of the clip body 78 and the metal clip 74 is disposed on the outer surface of the clip body 78. The metal teeth 76 are designed such that when the tracing clip 70 is attached to the fiber optic cable the metal teeth make an electrical connection with the metal element 14 without disrupting the normal operation of the fiber optic cable 12. In exemplary embodiments, the tracing clip 70 may be generally toroidal or cylindrical in shape. The tracing clip 70 may also include a hinge portion 80 that facilitates securing the tracing clip 70 to the fiber optic cable 12.

In exemplary embodiments, the fiber optic cable 12 may include a cover 72 that may be made of any suitable insulating material including, but not limited to, rubber or plastic. Additionally, the metal teeth 76 may penetrate the cover 72 of the fiber optic cable 12. The metal teeth 76 are designed such that when the tracing clip 70 is attached to the fiber optic cable the metal teeth penetrate the cover 72 and make an electrical connection with the metal element 14 without disrupting the normal operation of the fiber optic cable 12.

In exemplary embodiments a fiber optic cable 12 may be traced by using a plurality of tracing clips 70. The fiber optic cable 12 to be traced will be identified and a first tracing clip 70 will be attached to the fiber optic cable 12 and a tone generator will be attached to the first tracing clip 70. Additionally, a plurality of tracing clips 70 will be attached to a plurality of fiber optic cables 70 and a plurality of speakers will be attached to the tracing clips 70. A second tracing clip 70 is attached to the same fiber optic cable 12 as the first tracing clip 70. Once the tone generator is activated the corresponding speaker will emit a tone and thereby identify the desired fiber optic cable 12.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A tracing clip for a fiber optic cable comprising:
    a clip body including an inner and an outer surface;
    a metal clip disposed on the outer surface;
    wherein the metal clip connects to a metal element extending axially along the entire length of the fiber optic cable and to the metal clip; and
    a hinge portion that secures the tracing clip to the fiber optic cable.

2. The tracing clip of claim 1, wherein the tracing clip has a toroidal shape.

3. The tracing clip of claim 2, wherein the metal clip connects to the metal element through a metal tooth extending radially inward from the inner surface.

4. The tracing clip of claim 3, wherein the metal tooth connects to the metal element without disrupting the normal operation of the fiber optic cable.

5. The tracing clip of claim 3, wherein the metal tooth is capable of penetrating a cover disposed on the exterior of the fiber optic cable.

6. A method of tracing a fiber optic cable comprising:
    selecting the fiber optic cable to be traced, wherein the fiber optic cable includes a metal element axially disposed along the entire length of the cable;
    attaching a first tracing clip to the fiber optic cable, the first tracing clip including a metal clip to form an electrical connection to the metal element; and
    applying a tracing signal to the first tracing clip.

7. The method of claim 6 comprising:
    attaching a second tracing clip to the fiber optic cable, the second tracing clip including a second metal clip to form an electrical connection to the metal element; and
    detecting the presence of the tracing signal at the second tracing clip.

8. The method of claim 7, wherein a tone generator is used to apply the tracing signal to the first tracing clip.

9. The method of claim 6 comprising:
    attaching a plurality of speakers to a plurality of tracing clips disposed on a plurality of fiber optic cables; and
    detecting the tracing signal by listening for a tone from one of the speakers.

10. A fiber optic connector for connecting a fiber optic cable to a light source comprising:
    a light source housing for connection to a light source;
    a coupling for connection to a fiber optic cable, wherein the fiber optic cable includes a metal element and the coupling includes a cage for locking the light source housing to the coupling to connect the fiber optic cable to the light source housing; and
    a metal clip connected to the metal element.

11. The fiber optic connector of claim 10, wherein the metal clip is disposed next to the cage.

* * * * *